Figure 1:
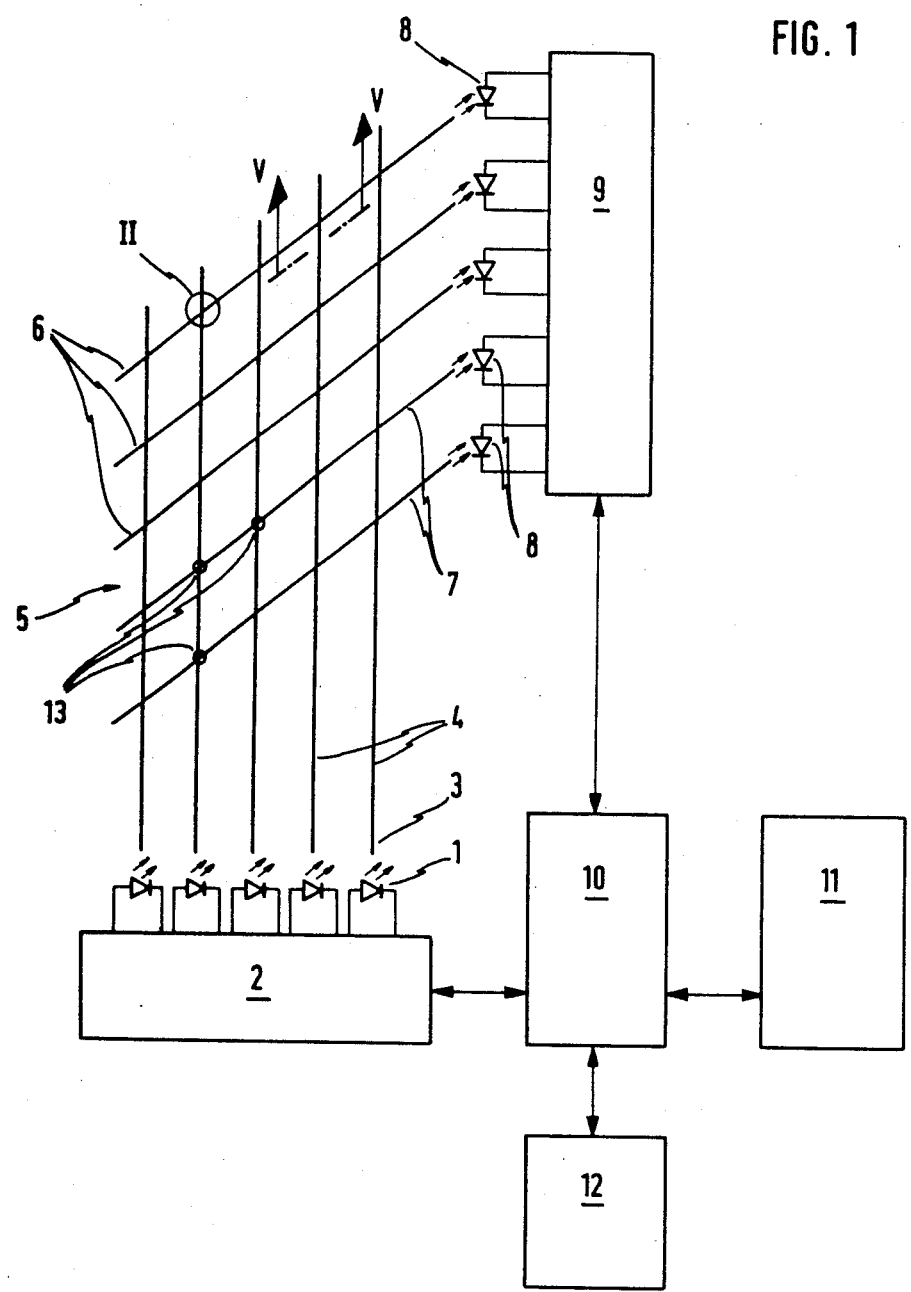

United States Patent [19]
Brunner et al.

[11] Patent Number: 4,901,584
[45] Date of Patent: Feb. 20, 1990

[54] METHOD OF MEASURING LOCALLY SPECIFIC PRESSURES

[76] Inventors: Wolfgang Brunner, Ringenberg 175, D-8999 Maierhöfen; Ludwig V. Zech, Argensee 3, D-7964 Kissleg, both of Fed. Rep. of Germany

[21] Appl. No.: 311,987
[22] Filed: Feb. 16, 1989
[30] Foreign Application Priority Data

Feb. 17, 1988 [DE] Fed. Rep. of Germany ..... 88102301

[51] Int. Cl.⁴ ............................ G01L 5/16; G01L 1/24
[52] U.S. Cl. ................................. 73/862.04; 250/227; 341/31
[58] Field of Search ................. 73/862.04, 865.7, 705, 73/172, 800, 862.38, 862.64; 250/227; 341/31

[56] References Cited

U.S. PATENT DOCUMENTS 4,360,247 11/1982 Beasley ............................ 73/705 X
4,480,183 10/1984 Ely et al. ........................... 341/31 X
4,733,068 3/1988 Thiele et al. ...................... 341/31 X
4,781,056 11/1988 Noel et al. ....................... 250/227 X Primary Examiner—Charles A. Ruehl
Attorney, Agent, or Firm—Max Fogiel

[57] ABSTRACT

A method of measuring locally specific pressures with an instrument that employs a matrix of intersecting columns and lines, each consisiting of pressure-transmitting conductors. The conductors are optical fibers. The column-associated optical fibers and the line-associated optical fibers are arrayed such that a locally specific pressure at their point of intersection produces an area of contact of different size. Light is introduced at at least one end of only a single column-associated or line-associated optical fiber. The amount of light coupled in at the points of intersection is read out at all optical fibers intersecting these optical fibers. The result is a locally specific distribution of pressure.

18 Claims, 4 Drawing Sheets

METHOD OF MEASURING LOCALLY SPECIFIC PRESSURES

A method for measuring local pressures can be employed for example to obtain measurements in the fields of medicine, orthopedics, and materials testing, to check tire treads, to verify the homogeneity of plastic laminations, and in impact tests. The distribution of pressure throughout the foot of a walking subject can be measured with high precision in relation to space and time for example.

A matrix-based instrument for measuring locally specific pressures is known (German Patent No. 2 529 475). Electric signals are, line by line and column by column, applied to and read out from sensors, which can be pressure-dependent capacitors or resistors.

The drawback of this known electric-measurement method is that the signals are subject to a high level of interference from electromagnetic interference fields. Furthermore, since undesirably high capacities can occur over long measurement paths, its local precision is limited. Again, the transient phenomena take time and allow only limited precision with respect to time. Finally, when rubber materials are employed in the instrument, an undesirable hysteresis can be expected.

The object of the invention is accordingly to provide a rapid and low-interference method of determining locally specific pressures in relation to space and time.

Figure 2:
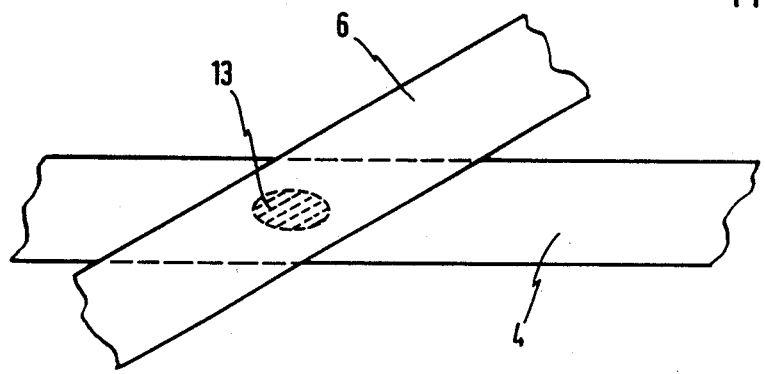
Figure 3:
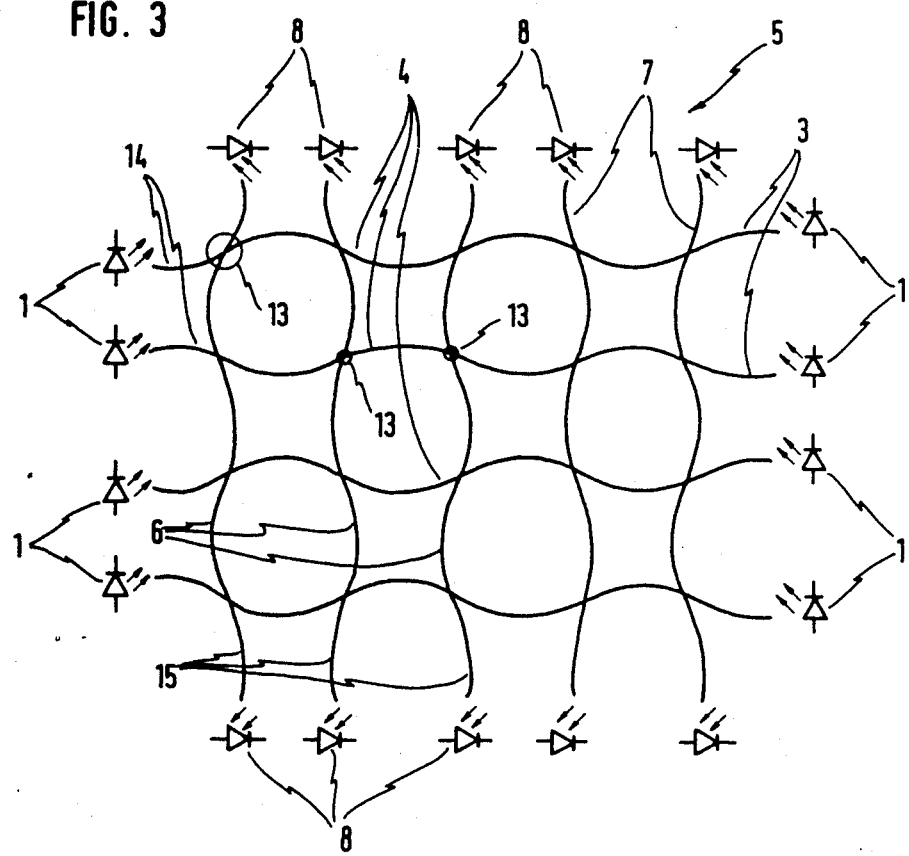
Figure 4:
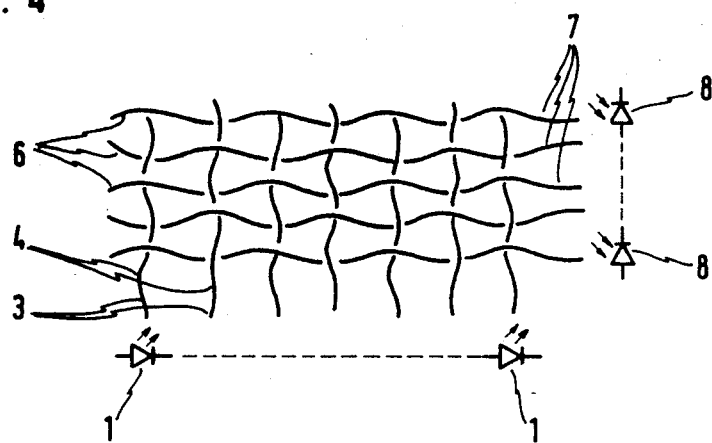
Figure 5:
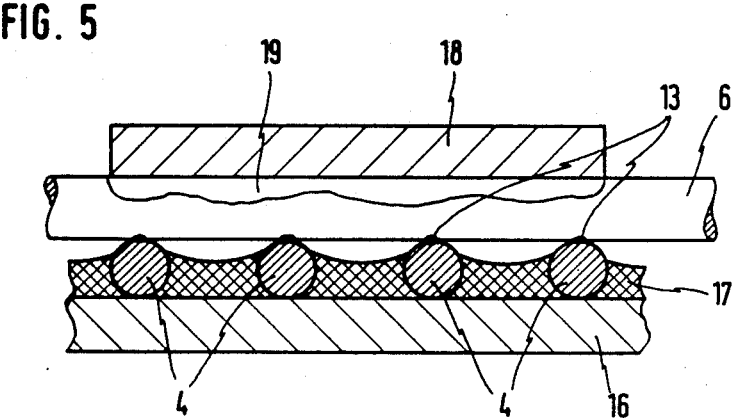
Figure 6:
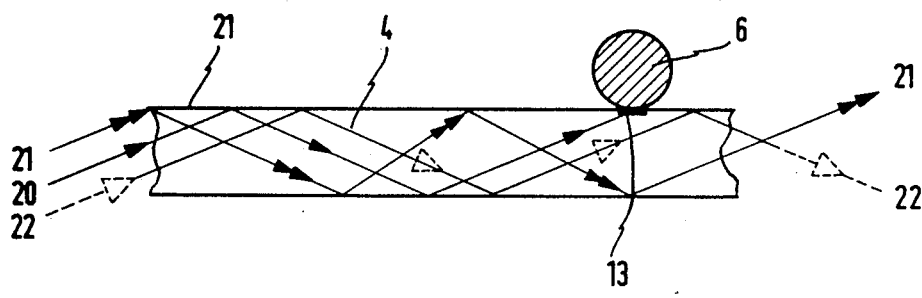
Figure 7:
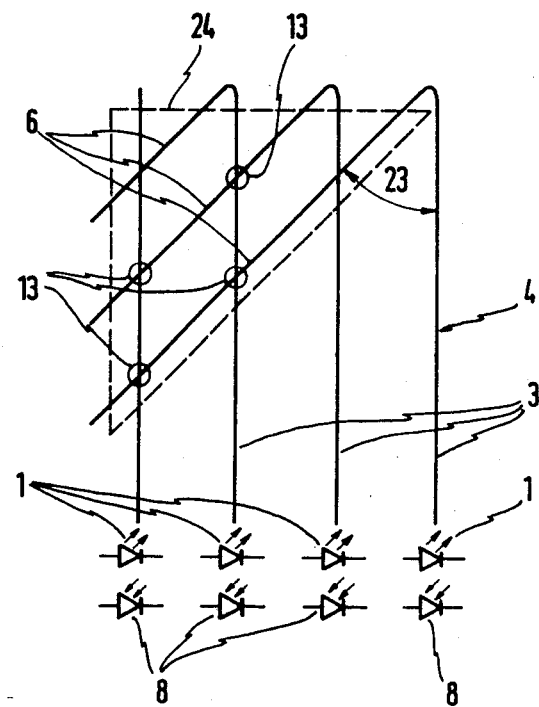

Preferred embodiments of the invention will now be described in greater detail by way of example and with reference to the drawing, wherein FIG. 1 is a schematic illustration of a system for carrying out the method of measurement, FIG. 2 is a detail of the area II in FIG. 1, FIG. 3 illustrates an alternative embodiment of the instrument illustrated in FIG. 1, FIG. 4 illustrates a third embodiment of the instrument illustrated in FIG. 1, FIG. 5 is a section along the line V—V in FIG. 1, FIG. 6 is a schematic section through an optical fiber, and FIG. 7 illustrates a fifth embodiment of the instrument illustrated in FIG. 1.

FIG. 1 on the whole illustrates controls 2 along with the sources 1 of light individually controlled by them. Each source 1 of light, which can for example be an LED, is positioned at the end 3 of an optical fiber 4 associated with one column in a matrix-based measuring instrument 5. Column-associated optical fibers 4 intersect with line-associated optical fibers 6. At one end 7 of each fiber 6 is a light detector 8 that is a component of an optical reader 9. Optical reader 9 is connected to main controls 10 that coordinate controls 2 and optical reader 9 in relation to time and supply an output unit 11 (a video-display terminal and/or printer) with the results. The results can also be stored in a memory 12.

FIG. 2 illustrates the detail II in FIG. 1. It will be evident that the area of contact at the points 13 of intersection between column-associated optical fibers 4 and line-associated optical fibers 6 will become larger or smaller in accordance with the amount of pressure prevailing at that point. Furthermore, the area above the quantity of light introduced by the column-associated optical fibers 4 into the line-associated optical fibers 6 would also expand.

FIG. 3 illustrates another embodiment of a matrix-based instrument 5. Unlike the embodiment illustrated in FIG. 1, a source 1 of light is positioned at both end 3 and end 14 of each column-associated optical fiber 4 and a light detector 8 is positioned at both end 7 and end 15 of each line-associated optical fiber 6. Furthermore, the optical fibers extend in undulations rather than in a straight line between two points 13 of intersection, and the angle between the column-associated and the line-associated optical fibers is roughly right 90° instead of acute as it is in the system illustrated in FIG. 1.

FIG. 4 illustrates a design that is similar to that illustrated in FIG. 3 with the exception that the optical fibers are interwoven.

FIG. 5 is a schematic section through the embodiment illustrated in FIG. 1. Column-associated optical fibers 4 are mounted on a base plate 16 and embedded in a mass of adhesive 17 that secures them such that they come into contact at points 13 of intersection with transverse line-associated optical fibers 6, which are also embedded in another mass of adhesive 19 on an elastic base plate 18.

FIG. 6 illustrates how light travels through optical fibers with a homogeneous index of refraction. Once introduced, the beam of light is completely reflected at the surface 21 of column-associated optical fibers 4. Some of the light, beam 20 for instance, can transfer into a line-associated optical fiber 6 at a point 13 of intersection. This would be impossible, however, for such other components as the beam 21 indicted by the double-headed arrow or the beam 22 indicated by the broken-line arrow.

FIG. 7 illustrates another alternative. The lower end 3 of each column-associated optical fiber 4 is provided with both a source 1 of light and a light detector 8. The upper end of each column-associated optical fiber is bent at an acute angle 23 to create line-associated optical fibers 6, which they intersect at points 13. One individual source 1 is activated at one end 3 of each column-associated optical fiber 4. The other sources are, along with the light detector 8 associated with the same column-associated optical fiber 4 as the source that has just been activated, turned off. The distribution of locally specific pressures throughout an area that is to be tested and that is represented by the broken-line triangle in FIG. 7 can be determined by activating all the other sources of light in sequence.

We claim:

1. A method for measuring locally predetermined pressures comprising the steps: forming a matrix of intersecting columns and rows of pressure-transmitting conductors in form of optical fibers; arraying the optical fibers of said columns and the optical fibers of said rows with points of intersection; producing areas of contact at said points of intersection dependent on local pressures at said points of intersection; introducing light at at least one end of only a single optical fiber of a column or a row; reading out the amount of light coupled at points of intersection of all optical fibers with said single optical fiber, said intersecting optical fibers being in contact; and measuring local pressures at points of intersection from variations of the areas of contact between the intersecting optical fibers, measurement of said pressures being dependent on the material of said optical fibers.

2. A method as defined in claim 1, wherein said optical fibers have an index of refraction that is homogeneous over the cross-sections of said optical fibers.

3. A method as defined in claim 1, wherein said intersecting optical fibers are interwoven.

4. A method as defined in claim 1, including the step of embedding said optical fibers in an electrically conductive material.

5. A method as defined in claim 4, wherein said electrically conductive material prevents non-intersecting optical fibers from becoming displaced, said electrically conductive material allowing intersecting optical fibers to come into contact.

6. A method as defined in claim 5, including the step of curving in said optical fibers by at least one undulation between said points of intersection.

7. A method as defined in claim 1, wherein said intersecting optical fibers form an angle between 45° and 90°.

8. A method as defined in claim 1, wherein said step of reading out is carried out at all columns or rows individually or in groups and simultaneously or sequentially.

9. A method as defined in claim 1, wherein light is introduced at both ends of each optical fiber.

10. A method as defined in claim 1, wherein said light is introduced through light-emitting diodes or rapid-action laser diodes.

11. A method as defined in claim 1, wherein said light is read out through light detectors.

12. A method as defined in claim 1, wherein said light is read out at both ends of an optical fiber.

13. A method as defined in claim 12, wherein said light is read out be light detectors comprising p.i.n. diodes.

14. A method as defined in claim 1, including the step of positioning one source of light and one light detector at only one end of each optical fiber, only one source of light emitting light constantly; and measuring light that is coupled-in by all light detectors with the exception of the light detector associated with said source emitting light constantly.

15. A method as defined in claim 14, wherein said one source of light and said one light detector are positioned at one end of optical fibers of said columns; bending said optical fibers of said columns at an acute angle at the other end of said optical fibers of said columns, said other end of said optical fibers of said columns to extend onward and form said rows of optical fibers.

16. A method as defined in claim 1, wherein results of said measuring step are introduced and read out by long sheaves of optical fibers extending to a spatially remote location.

17. A method for measuring locally predetermined pressures comprising the steps: forming a matrix of intersecting columns and rows of pressure-transmitting conductors in form of optical fibers; arraying the optical fibers of said columns and the optical fibers of said rows with points of intersection; producing areas of contact at said points of intersection dependent on local pressures at said points of intersection; introducing light at at least one end of only a single optical fiber of a column or a row; reading out the amount of light coupled at points of intersection of all optical fibers with said single optical fiber, said intersecting optical fibers being in contact; and measuring local pressures at points of intersection from variations of th areas of contact between the intersecting optical fibers, measurement of said pressures being dependent on the material of said optical fibers, said intersecting optical fibers intersecting at a non-perpendicular angle.

18. A method for measuring locally predetermined pressures comprising the steps: forming a matrix of intersecting columns and rows of pressure-transmitting conductors in form of optical fibers; arraying the optical fibers of said columns and the optical fibers of said rows with points of intersection; producing areas of contact at said points of intersection dependent on local pressures at said points of intersection; introducing light at at least one end of only a single optical fiber of a column or a row; reading out the amount of light coupled at points of intersection of all optical fibers with said single optical fiber, said intersecting optical fibers being in contact; and measuring local pressures at points of intersection from variations of the areas of contact between the intersecting optical fibers, measurement of said pressures being dependent on the material of said optical fibers, said optical fibers having an index of refraction that is homogeneous over the cross-sections of said optical fibers, said intersecting optical fibers being interwoven and being embedded in an electrically conductive material for preventing non-intersecting optical fibers from becoming displaced and allowing intersecting optical fibers to come into contact; curving said optical fibers in at least one undulation between the points of intersection, intersecting optical fibers forming an angle therebetween within the range of 45° to 90°; said reading out step occurring at all columns or lines of optical fibers individually or in groups and simultaneously or sequentially; introducing light at both ends of each optical fiber through light-emitting diodes or rapid-action laser diodes; said reading out step being carried out with light detectors at both ends of an optical fiber, said detectors comprising p.i.n. diodes; positioning one source of light and one light detector at only one end of each optical fiber, only one source of light emitting light constantly and having an associated detector, and measuring said coupled-in light with all light detectors except the detector associated with said light source emitting light constantly; bending optical fibers in said columns at an acute angle at one end and extending the bent optical fibers onward to form said rows of optical fibers, the source of light and a light detector being positioned at the other end of the bent optical fibers; introducing and reading out signals representing results of said measurement step with long sheaves of optical fibers to a spatially remote location.

* * * * *